US008949425B2

(12) United States Patent
Gusev et al.

(10) Patent No.: US 8,949,425 B2
(45) Date of Patent: Feb. 3, 2015

(54) "LOCAL RESOURCE" TYPE AS A WAY TO AUTOMATE MANAGEMENT OF INFRASTRUCTURE RESOURCES IN ORACLE CLUSTERWARE

(75) Inventors: Andrey Gusev, Dublin, CA (US); Ashwinee Khaladkar, Mountain View, CA (US); Jonathan Creighton, Oakland, CA (US); Raj K. Kammend, Colleyville, TX (US)

(73) Assignee: Oracle International Corporation, Redwood Shores, CA (US)

( * ) Notice: Subject to any disclaimer, the term of this patent is extended or adjusted under 35 U.S.C. 154(b) by 623 days.

(21) Appl. No.: 12/688,715

(22) Filed: Jan. 15, 2010

(65) Prior Publication Data
US 2011/0179170 A1 Jul. 21, 2011

(51) Int. Cl.
G06F 15/173 (2006.01)
G06F 9/50 (2006.01)

(52) U.S. Cl.
CPC .................................. G06F 9/5011 (2013.01)
USPC ....................................................... 709/226

(58) Field of Classification Search
CPC ................ G06F 9/50; G06F 9/5011
USPC ....................................................... 709/226
See application file for complete search history.

(56) References Cited

U.S. PATENT DOCUMENTS

| | | | |
|---|---|---|---|
| 6,154,849 A | 11/2000 | Xia | |
| 6,308,163 B1 | 10/2001 | Du et al. | |
| 6,393,485 B1 | 5/2002 | Chao et al. | |
| 6,516,350 B1 | 2/2003 | Lumelsky et al. | |
| 6,594,779 B1 | 7/2003 | Chandra et al. | |
| 6,782,408 B1 | 8/2004 | Chandra et al. | |
| 6,931,640 B2 | 8/2005 | Asano et al. | |
| 6,990,666 B2 | 1/2006 | Hirschfeld et al. | |
| 7,281,045 B2 | 10/2007 | Aggarwal et al. | |
| 7,340,578 B1 | 3/2008 | Khanzode | |
| 7,383,383 B1 | 6/2008 | Bandopadhyay et al. | |
| 7,392,421 B1 | 6/2008 | Bloomstein et al. | |
| 7,451,201 B2 | 11/2008 | Alex et al. | |
| 7,464,147 B1 | 12/2008 | Fakhouri et al. | |
| 7,480,281 B2 | 1/2009 | Hare et al. | |
| 7,484,223 B2 | 1/2009 | Hill et al. | |
| 7,581,224 B2 | 8/2009 | Romero | |
| 7,827,302 B2 | 11/2010 | Weinert et al. | |
| 7,904,756 B2 | 3/2011 | Dilman et al. | |
| 8,020,034 B1 | 9/2011 | Shrivastava et al. | |
| 8,103,635 B2 | 1/2012 | Lee et al. | |
| 8,154,554 B1 | 4/2012 | Brown et al. | |

(Continued)

OTHER PUBLICATIONS

Richard Strohm "Oracle Clusterware Administration and Deployment Guide, 11g Release 2 (11.2)", dated Aug. 2009.*

(Continued)

*Primary Examiner* — Boris Gorney
(74) *Attorney, Agent, or Firm* — Hickman Palermo Truong Becker Bingham Wong LLP

(57) ABSTRACT

A method and computer-readable storage representing resources in a cluster by a plurality of attribute-value pairs that together are part of a "resource profile," in which each attribute-value pair defines all, or a portion of, a management policy that applies to the resource. Included is a built-in resource type called a "Local Resource" type. Local resources that are attached to the server are instantiated with a combination of the resource profile and values of the Local Resource type.

20 Claims, 3 Drawing Sheets

(56) References Cited

U.S. PATENT DOCUMENTS

| | | | |
|---|---|---|---|
| 8,180,864 B2 | 5/2012 | Ghattu | |
| 8,180,922 B2 | 5/2012 | Dini et al. | |
| 8,364,648 B1 | 1/2013 | Sim-Tang | |
| 8,364,726 B2 | 1/2013 | Georgiev | |
| 8,429,450 B2 | 4/2013 | Brown et al. | |
| 8,543,862 B2 | 9/2013 | Dilman et al. | |
| 2002/0087665 A1 | 7/2002 | Marshall et al. | |
| 2002/0120744 A1 | 8/2002 | Chellis et al. | |
| 2002/0124085 A1 | 9/2002 | Matsuda et al. | |
| 2002/0198984 A1 | 12/2002 | Goldstein et al. | |
| 2002/0198996 A1 | 12/2002 | Sreenivasan et al. | |
| 2003/0126240 A1 | 7/2003 | Vosseler | |
| 2004/0226025 A1* | 11/2004 | Beaudoin et al. | 719/321 |
| 2005/0177628 A1 | 8/2005 | Victoria et al. | |
| 2005/0188283 A1 | 8/2005 | Pomaranski et al. | |
| 2005/0198275 A1 | 9/2005 | D'Alo et al. | |
| 2005/0234931 A1* | 10/2005 | Yip et al. | 707/100 |
| 2006/0047813 A1 | 3/2006 | Aggarwal et al. | |
| 2006/0053410 A1 | 3/2006 | Charisius et al. | |
| 2006/0163338 A1* | 7/2006 | Allen et al. | 235/375 |
| 2006/0195448 A1 | 8/2006 | Newport | |
| 2006/0206860 A1 | 9/2006 | Dardinski | |
| 2007/0168965 A1* | 7/2007 | Zenz et al. | 717/121 |
| 2007/0174101 A1 | 7/2007 | Li et al. | |
| 2008/0021917 A1 | 1/2008 | Baker et al. | |
| 2008/0052719 A1 | 2/2008 | Briscoe et al. | |
| 2008/0141261 A1 | 6/2008 | Machida | |
| 2008/0209397 A1 | 8/2008 | Mohindra et al. | |
| 2008/0222642 A1 | 9/2008 | Kakarla et al. | |
| 2008/0312982 A1 | 12/2008 | Braun et al. | |
| 2008/0320460 A1 | 12/2008 | Miller et al. | |
| 2009/0006888 A1 | 1/2009 | Bernhard et al. | |
| 2009/0037367 A1 | 2/2009 | Wein | |
| 2009/0043809 A1 | 2/2009 | Fakhouri et al. | |
| 2009/0054140 A1 | 2/2009 | Beser et al. | |
| 2009/0125751 A1 | 5/2009 | Dawson et al. | |
| 2009/0172668 A1 | 7/2009 | Bobak et al. | |
| 2009/0222540 A1 | 9/2009 | Mishra et al. | |
| 2009/0290483 A1 | 11/2009 | Curtis et al. | |
| 2009/0328024 A1 | 12/2009 | Li et al. | |
| 2010/0064009 A1 | 3/2010 | Chen et al. | |
| 2010/0107172 A1 | 4/2010 | Calinescu et al. | |
| 2010/0161290 A1 | 6/2010 | Duchenay et al. | |
| 2010/0241896 A1 | 9/2010 | Brown et al. | |
| 2010/0257535 A1 | 10/2010 | Badovinatz et al. | |
| 2010/0332659 A1 | 12/2010 | Marowsky-Bree et al. | |
| 2011/0119681 A1 | 5/2011 | Spencer et al. | |
| 2011/0125895 A1 | 5/2011 | Anderson et al. | |
| 2011/0145392 A1 | 6/2011 | Dawson et al. | |
| 2011/0179169 A1 | 7/2011 | Gusev et al. | |
| 2011/0179171 A1 | 7/2011 | Gusev et al. | |
| 2012/0226788 A1 | 9/2012 | Jackson | |
| 2013/0024728 A1 | 1/2013 | Lee et al. | |
| 2014/0149783 A1 | 5/2014 | Georgiev | |

OTHER PUBLICATIONS

Strohm, Richard, "Oracle Clusterware Adminstration and Deployment Guide", 11g Release 1 (11.1), dated Sep. 2007, 180 pages.

Microsoft Computer Dictionary, dated 2002, Microsoft Press, 5th edition, 3 pages.

* cited by examiner

"LOCAL RESOURCE" TYPE AS A WAY TO AUTOMATE MANAGEMENT OF INFRASTRUCTURE RESOURCES IN ORACLE CLUSTERWARE

CROSS-REFERENCE TO RELATED APPLICATIONS; BENEFIT CLAIM

This application is related to the following applications:
(1) application Ser. No. 12/688,710, entitled "Special Values In Oracle Clusterware Resource Profiles", filed on Jan. 15, 2010;
(2) application Ser. No. 12/688,723, entitled "Unidirectional Resource and Type Dependencies In Oracle Clusterware", filed on Jan. 15, 2010;
(3) application Ser. No. 12/688,735, entitled "Self-Testable HA Framework Library Infrastructure", filed on Jan. 15, 2010;
(4) application Ser. No. 12/688,739, entitled "Dependency On A Resource Type", filed on Jan. 15, 2010;
(5) application Ser. No. 12/688,769, entitled "Dispersion Dependency In Oracle Clusterware", filed on Jan. 15, 2010;
(6) application Ser. No. 12/688,800, entitled "Conditional Dependency in a Computing Cluster", filed on Jan. 15, 2010, the entire contents of each of the above applications is hereby incorporated by reference as if fully set forth herein. The applicants hereby rescind any disclaimer of claim scope in the related applications.

FIELD OF THE INVENTION

The present invention relates to management of applications and resources in a clustered computing environment.

BACKGROUND

Clusterware

Clusterware is a general term that refers to a software product that is used to combine a set of nodes or computers into a single entity, all members working together as a logical unit. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS), such as those produced by Oracle Corporation, 500 Oracle Parkway, Redwood Shores Calif.

Clusterware may be implemented as middleware, residing between the operating system and any applications. Clusterware may also be implemented as part of the operating system. A cluster manager, or a node with management authority, manages the resources and services of a cluster. A component of the cluster manager known as the policy engine is the portion of clusterware responsible for managing services on the cluster.

Clusterware Services

Services such as membership services are provided by the clusterware. Membership determines what computers or nodes are parts of the cluster, and which computers and nodes remain in the cluster. If a node that is part of the cluster fails, for example, clusterware membership services determine which other nodes should be included in the cluster. Similarly, clusterware membership services determine how nodes are added to a cluster.

Resource management is another service provided by clusterware. Resource management techniques may vary with each clusterware product. In some implementations, clusterware considers everything under management as a resource, and with knowledge of resources defined in a resource profile for that resource. A resource is an allocation of hardware and storage, such as one or more operating system processes and volatile virtual memory, and/or volatile memory allocated to running a particular software module or application. In order to function properly, resources may depend on other computer components to be online and/or be configured in a certain way. Such computer components are also referred to as resources.

To manage a resource means to perform activities related to that resource. These activities may, for example, cause the resource to behave, be provisioned in a particular manner, or brought online on a particular node. For example, putting an Internet Protocol (IP) address in the proper configuration location for a web server is a way of managing an IP address, while restarting the web server is a way of managing the web server.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles.

While the cluster model is easily adaptable for modular incremental system growth, actually adding or removing nodes to a cluster can be difficult in practice, as the particular resources attached to a node may vary from node to node. In the context of node removal, resources attached to the node may require shutdown in a particular order or manner that varies by node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Resources in a cluster may be represented by a plurality of attribute-value pairs that together are part of a "resource profile," in which each attribute-value pair defines all, or a portion of, a management policy that applies to the resource. Resources are typed, so that while each instance of a resource type may have its own unique values, the domain of values to be defined is likely to be identical over all instances.

The clusterware model then includes a built-in resource type called a "Local Resource" type. Using the Local Resource type, a single local resource type profile that specifies resource profile attributes for a resource to configure on every node in a cluster of nodes is stored. A clusterware manager adding nodes to the cluster may configure the resource according to the single local resource profile. The clusterware manager may construct a default configuration according to the single local resource profile and locate zero or more override profile attributes for the configuration of the resource.

Sample Cluster Hardware Organization

Figure 1:
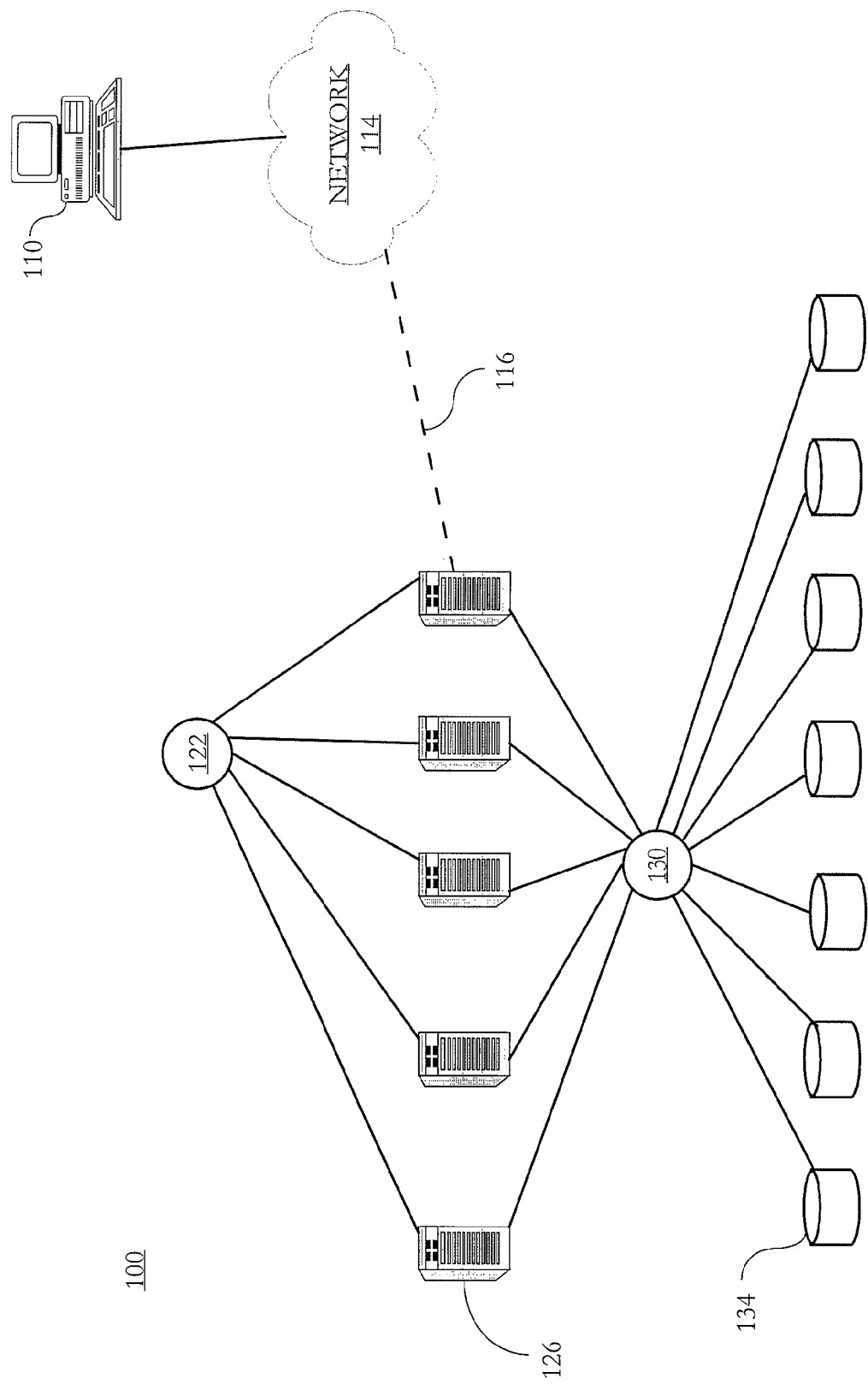
FIG. 1 illustrates hardware organization of a sample cluster upon which embodiments of the invention may be implemented.

FIG. 1 illustrates a sample cluster upon which embodiments of the invention may be implemented. Cluster 100 includes a user group (not shown), network 114, interconnect 122, one or more clustered servers 126, switch interconnect 130, and disk subsystem 134.

Users in the user group access network 114 through physical platforms such personal computers, workstations, notebook computers, netbook computers, and handheld devices (not shown in FIG. 1) having network connectivity. Network connectivity may be provided by physically wired connections (such as Ethernet, USB, or FireWire) or may be provided by wireless connections (such as Wi-Fi, Bluetooth, or IrDA). Network 114 provides users access to one or more clustered servers 126, with sample connection illustrated by dashed line 116.

Interconnect 122 is a private local area network among one or more clustered servers 126. Interconnect 122 is used for inter-node messaging and may operate using User Datagram Protocol.

Each of one or more clustered servers 126 is connected to interconnect 122. Servers comprising each of one or more clustered servers 126 may be any computer having a network-capable operating system and providing network services. In an embodiment, servers comprising each of one or more clustered servers 126 may have different operating systems and/or architectures. In an embodiment, servers comprising each of one or more clustered servers 126 share a common operating system and common architecture, for example, 32-bit or 64-bit. Examples include blade servers (such as a Sun Ultrasparc Server Module), rackmount servers (such as a Sun Fire Server), and workstation servers (such as a Sun Ultra Workstation).

Switch interconnect 130 connects one or more clustered servers 126 to disk subsystem 134 (pictorially represented as a plurality of disks). Switch interconnect 130 comprises hardware and software that moves data from each of one or more clustered servers 126 to a desired disk in disk subsystem 134.

Disk subsystem 134 is comprised of a plurality of disks, and may comprise disks having differing physical capacities, differing operating conditions, and differing manufactures. Switch interconnect 130 permits any of one or more clustered servers 126 to access any disk in disk subsystem 130.

While FIG. 1 may appear to depict a static cluster environment, in actual operation various elements of FIG. 1 may vary over time, with the clusterware performing appropriate resource modifications. Users may connect and disconnect in an apparently random fashion, or in a predictable fashion, or in a combination thereof. Servers may be added to, or removed from, the one or more clustered servers 126. Similarly, individual disks may be added to, or removed from, disk subsystem 130. The addition or removal of servers and the addition or removal of individual disks may be planned, as in situations involving upgrades or scheduled maintenance, or may be unplanned, such as an individual disk failure occurring unpredictably.

Sample Cluster Software Organization

Figure 2:
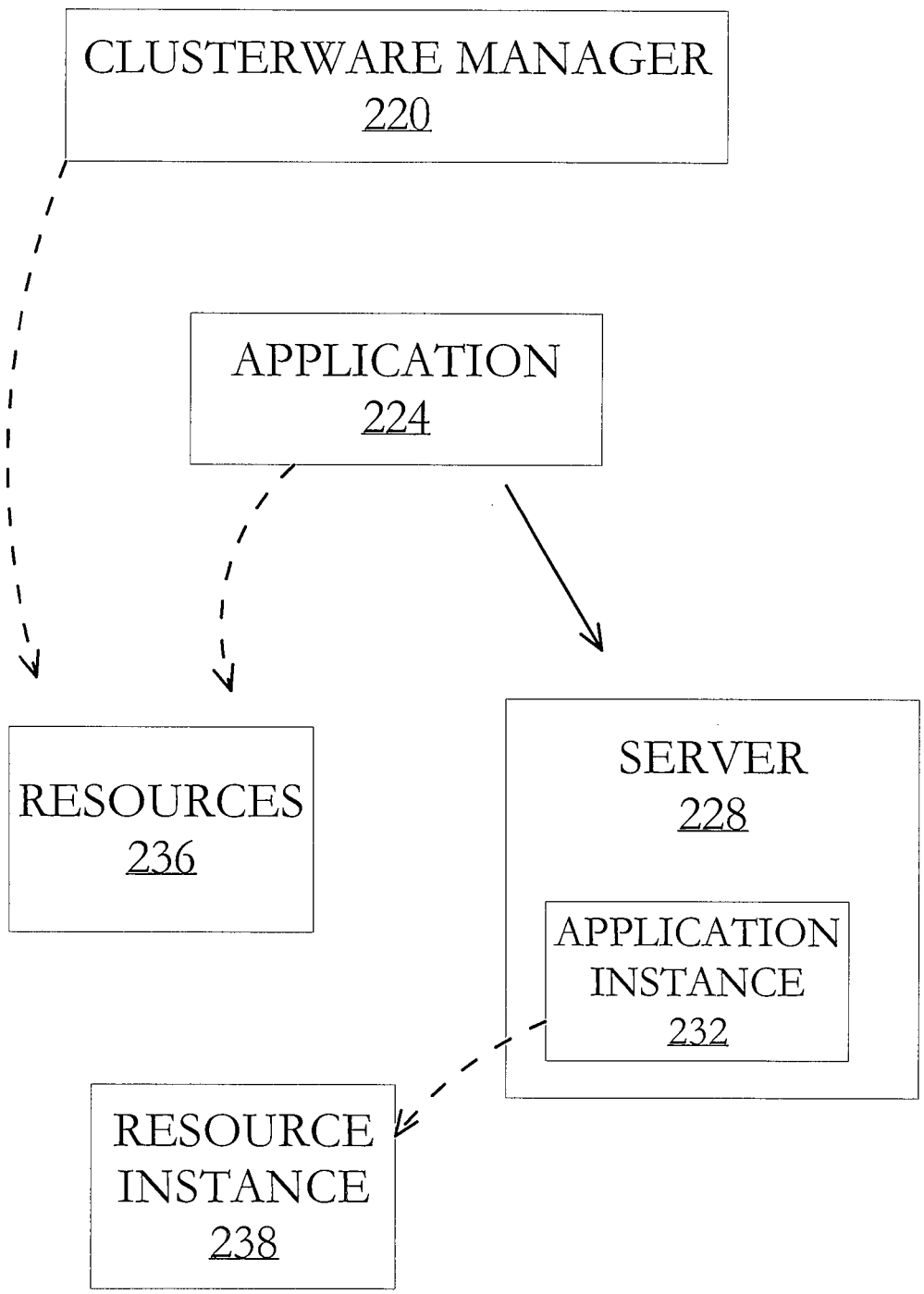
FIG. 2 illustrates a high-level software/hardware organization of a sample cluster in an embodiment of the invention.

FIG. 2 illustrates a high-level software organization of a sample cluster in an embodiment of the invention. Management and operation of cluster 100 is performed by clusterware manager 220. Components of clusterware manager 220 will be described later below. Application 224 operates in conjunction with clusterware manager 220. Application 224 represents a real-world application; in an embodiment, application 224 is a database application.

Server 228 is one of the one or more clustered servers 126 depicted in FIG. 1. Each of the one or more clustered servers 126, such as server 228, may run an application instance 232 of application 224.

Clusterware manager 220 may interact with, or control, one or more resources 236. Similarly, application instance 232, arising from application 224, may also interact with, or control, one or more resource instances 238 of a particular resource of the one or more resources 236. A particular resource (or a particular resource instance) may interact with, or be under the control of, one or both of clusterware manager 220 and application instance 232.

As previously stated, a resource comprises a physical or logical entity included in an application. A resource may comprise an individual software process; for example, an Oracle Grid Naming Service (GNS) process, an Oracle Automatic Storage Management Cluster File System (ACFS) process, a Network File System (NFS) process, or an X Clock process may be a resource. A resource may comprise an application or application instance; for example, an Oracle Automatic Storage Management (ASM) application, or an application produced by SAP, may be a resource.

As the definition of a resource is expansive, in FIG. 2, it is possible for identifiers to overlap for a particular entity. For example, in FIG. 2, server 228 may be considered as a particular resource of the one or more resources 236 with respect to clusterware manager 220.

1. Local Resource Type

One set of resources amenable to instantiation by the Local Resource type are resources that belong to each server, sometimes referred to as "infrastructure resources." Non-limiting examples of infrastructure resources include the following: network interfaces, processors, volatile and non-volatile memory, operating system, monitor, and printer. Some of the infrastructure resources may be considered "cluster-oblivious" as each internal state of these resources contains no information regarding the existence of the cluster, even though these resources may act upon instructions issued by the clusterware manager. For example, a processor on a node may be directed, by the clusterware, to perform clusterware-specific instructions even though the processor includes no internal logic directed specifically to the clusterware.

It is possible that a infrastructure resource may be "cluster-aware"—that is, the resource contains built-in or modified internal logic that is directed specifically to the clusterware. For example, a network interface card could contain, through a software module or firmware upgrade, logic directed specifically to the clusterware. However, such a configured network interface card is a infrastructure resource providing infrastructure to a particular server, and thus amenable to instantiation by the Local Resource type.

In an embodiment, at least one cluster-oblivious infrastructure resource is a Local Resource. In an embodiment, at least one cluster-aware infrastructure resource is a Local Resource.

Other resources, such as a particular application, may be amenable to instantiation by the Local Resource type, regardless if considered cluster-oblivious or cluster-aware, because the application is present on each node. For instance, each of a particular application instance 232 present on each server 228 in cluster 100 may be typed as a Local Resource. As an example, each server in an Oracle Clusterware cluster has an ASM instance that is local to that server.

In an embodiment, at least one application operating at a node is a Local Resource.

Finally, yet other resources amenable to instantiation by the Local Resource type are resources present on each server 228 in cluster 100 are logical entities affiliated with each server 228. For example, a TCP or MAC address may be a Local Resource.

In an embodiment, at least one logical entity related to a node is a Local Resource.

As explained below, the ability to model computer hardware or software components using the Local Resource type facilitates the addition or deletion of nodes from a cluster. When a new node is added to a cluster, the Local Resource type may be used to pass configuration information from the new node to the clusterware manager with little or no manual intervention. Similarly, when a node is to be removed from a cluster, the clusterware manager may take appropriate actions in the disconnection or shutdown of the node's local resources from the cluster.

Thus the clusterware manager automatically creates resource instances for all registered resources of the Local Resource type for all new nodes joining the cluster, and likewise sheds or removes the resource instances when nodes leave the cluster. The clusterware manager automatically 'expands' the data structures held in memory that represent the resource instances of the newly joined nodes, and no explicit requests are necessary to modify the configuration of the cluster. Similarly, the clusterware manager automatically 'shrinks' the data structures held in memory when a node leaves the cluster.

For example, ora.asm is a resource of a Local Resource type representing Oracle ASM instances in an Oracle Clusterware cluster. Each node in an Oracle Clusterware cluster has an ora.asm instance. If this cluster has two nodes, when the clusterware manager is queried, the clusterware manager will show the status of exactly two instantiations of this resource. If a third node joins the cluster, the same query to the clusterware manager will show the status of the three nodes, without any manual configuration changes required. Similarly, should two of the three nodes be powered off, the same query to the clusterware manager will show the status of the one instance of ora.asm assigned to the remaining node. No manual configuration changes are required.

2. Local Resource Properties

While the properties of a particular Local Resource type may depend on the particular implementation, in an embodiment, properties of a Local Resource type include a NAME, a BASE_TYPE, and one or more Attributes.

The NAME type may be in the form of a string. The BASE_TYPE may be in the form of an integer or a string; regardless of form, the value used will designate the resource as local, as opposed to a value that designates the resource to the cluster. The set of Attributes may include the name of the attribute as a string, with other attribute values being represented using integers or strings.

As a non-limiting example, consider a computer monitor connected to a server. The computer monitor need not be aware of the: (1) server's membership in a cluster, and (2) existence of clusterware possibly directing or coordinating the actions performed by the server. However, it may be beneficial for the clusterware to direct video output to the computer monitor. A sample Computer Monitor Local Resource type may contain the following properties:

NAME: ComputerMonitor
BASE_TYPE: Monitor
Attributes:
Screen kind: string
Dimension: string
Supported Resolutions: string
Weight: integer
Power Consumption: integer In this example, some sample instances of the Computer Monitor Local Resource type are the following:
{Flat; 19"; 600×400; 5; 30} and
{CRT; 17"; 600×400, 600×800; 7; 150}.

In an embodiment, properties of a Local Resource type include one or more FLAGS in the form of Boolean flags. In an embodiment, one or more FLAGS are included in the Attributes.

Other Local Resource types may correspond to the resources found in each node. In an embodiment, the set of Local Resource types includes a Processor Local Resource type whose instantiation describes the processor or processors operating in the node.

In an embodiment, the set of Local Resource types includes a Memory Local Resource type whose instantiation describes the local memory operating in the node.

In an embodiment, the set of Local Resource types includes a Network Interface Card Local Resource type whose instantiation describes the input-output connections available on the node.

In an embodiment, the set of Local Resource types includes a Non-Volatile Storage Local Resource type whose instantiation describes the non-volatile storage (if available) operating in the node.

In an embodiment, the set of Local Resource types includes a MAC Address Resource type whose instantiation describes the MAC Address identifying the node.

In an embodiment, a Local Resource type may inherit one other Local Resource type. For example, the set of Local Resource types may include a Blade Local Resource type that inherits one of the following types: the Processor, Memory, Network Interface Card, and Non-Volatile Storage Local Resource types.

3. Persistent Storage of Local Resource Type Overrides

A clusterware manager using the local resource type model is able to construct a complete model of all resources local to each node. One possible version of this model could require all instantiations of the local resource types for all nodes to be kept in a shared location. Such a model would require both a handshake and additional processing to handle nodes joining or leaving the cluster. Another possible version of this model could require each node to store all instantiations of the local resource types attached to the node. Upon connection of a new node with a cluster, the clusterware manager could initiate a handshake to acquire all information.

However, a more economical model that reduces the amount of information to be transferred by the handshake is possible. In an embodiment, clusterware manager 220 contains or accesses a persistent memory store containing default values for each item modeled using the Local Resource type. In an embodiment, each server 228 contains or accesses a persistent memory store containing override values. These override values are the instantiation of the resources modeled using the Local Resource type that are (1) particular to server 228 and are (2) other than the default values contained by clusterware manager 220.

It is possible that some resources have no logical default value to be accessed by clusterware manager 220. For example, each server has a unique MAC address, making nonsensical the notion of a 'default' MAC address. In such a situation, the default value selected may correspond to "unknown," with each server 228 expected to present the server's actual MAC address as an override value.

In an embodiment, the persistent memory store that is contained or accessed by each server 228 includes a cluster identifier used to identify all override values as for use in a particular cluster. Thus each server 228 may be swappable into a plurality of clusters, with override values particular to the cluster in which server 228 is placed.

As the override values for server 228 override default values contained or accessed by clusterware manager 220, once server 228 is disconnected from cluster 110, the override values are removed from clusterware manager 220. In an embodiment, all or a portion of the persistent memory store that is contained or accessed by each server 228 may be deleted or made otherwise inaccessible to clusterware manager 220.

In this manner, server 228 may be added to a first cluster, and override values for server 228 with respect to the first cluster are appropriately incorporated by clusterware manager 220 of the first cluster. Then, server 228 is disconnected from the first cluster, and server 228 is connected to a second cluster. Should server 228 have override values with respect to the second cluster, the appropriate override values with respect to the second cluster will be used by the second cluster. Should server 228 lack override values with respect to the second cluster, the second cluster will operate server 228 with respect to the default values held by the second cluster.

Similarly, should server 228 be disconnected from the second cluster and then connected to the first cluster, again the override values for server 228 with respect to the first cluster will be appropriately incorporated by clusterware manager 220 of the first cluster.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
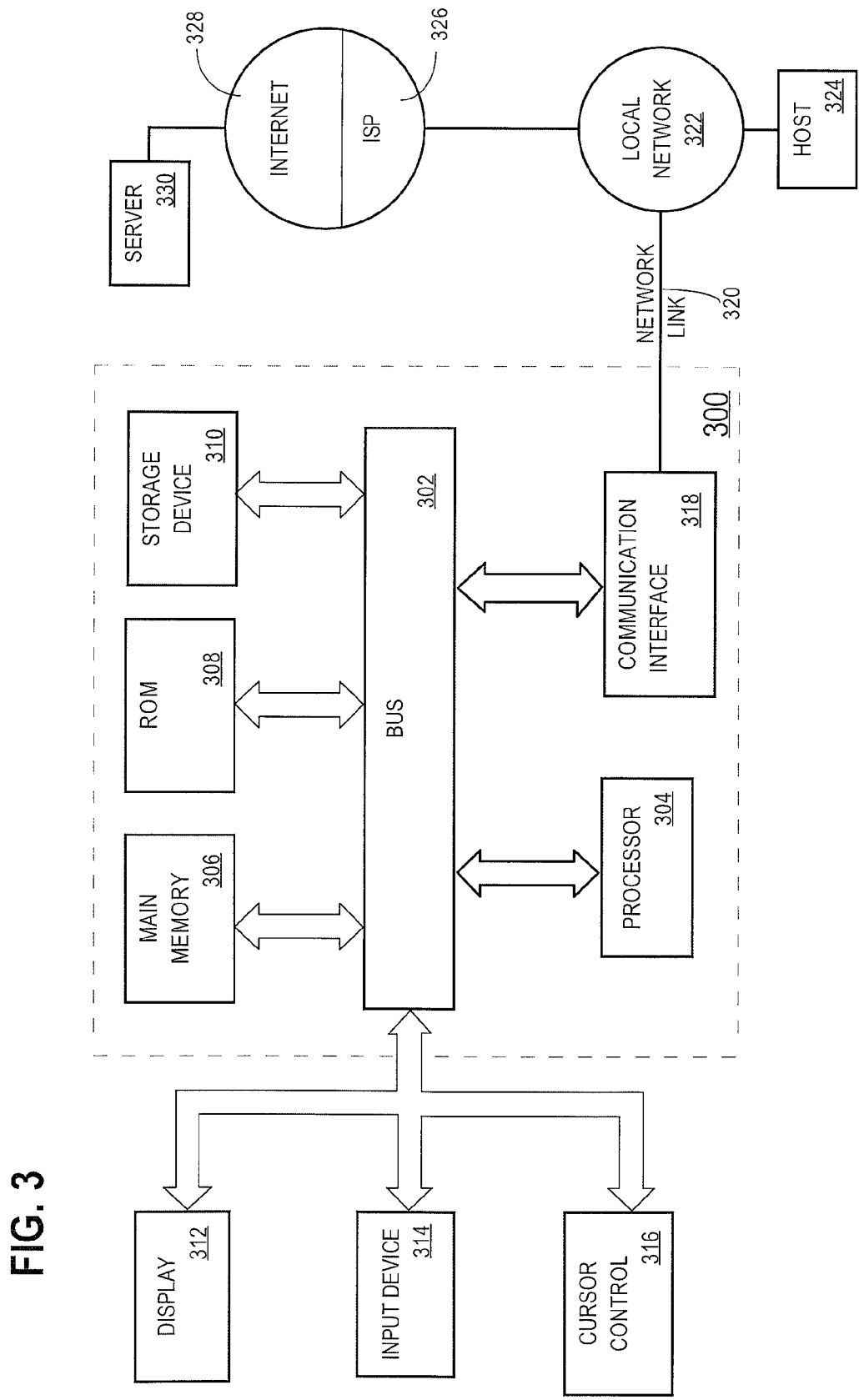
FIG. 3 illustrates a block diagram of a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing a single local resource profile that specifies attributes for a resource of a local resource type, wherein said single local resource profile is used for configuring nodes in a cluster to facilitate the addition of nodes to the cluster or the deletion of nodes from the cluster, and wherein said single local resource profile includes one or more attributes and one or more values of the one or more attributes; and
   for each node of a plurality of nodes, adding, by a clusterware manager, each said node to said cluster;
   wherein adding each said node includes:
      for each said node, creating a resource instance for the resource of the local resource type, wherein the resource instance includes one or more instance attributes and one or more instance values according to the one or more attributes and one or more values of the single local resource profile; and
      configuring another resource according to a resource profile specifically defined for each said node and said other resource;
   wherein the method is performed by one or more computing devices.

2. The method of claim 1, further including the step of deleting, by the clusterware manager, a particular node from the cluster, wherein deleting the particular node includes removing any resource instances of the particular node with the local resource type.

3. The method of claim 1, wherein the local resource type further includes a name and a base type.

4. The method of claim 1, wherein the resource is an infrastructure resource.

5. The method of claim 1, wherein adding each said node further includes, locating, in a local persistent memory, zero or more override values associated with the local resource type for zero or more attributes of the resource instance, wherein the resource instance is created further based on the zero or more override values.

6. A non-transitory computer-readable storage that stores instructions which, when executed by one or more processors, cause the one or more processors to perform the steps of:

storing a single local resource profile that specifies attributes for a resource of a local resource type, wherein said single local resource profile is used for configuring nodes in a cluster to facilitate the addition of nodes to or deletion of nodes from the cluster, and wherein said single local resource profile includes one or more attributes and one or more values of the one or more attributes;

for each node of a plurality of nodes, adding, by a clusterware manager, each said node to said cluster by:

for each said node, creating a resource instance for the resource of the local resource type, wherein the resource instance includes one or more instance attributes and one or more instance values according to the one or more attributes and one or more values of the single local resource profile; and configuring another resource according to a resource profile specifically defined for each said node and said another resource.

7. The non-transitory computer-readable storage of claim 6, further including instructions to perform the step of deleting a particular node from the cluster.

8. The non-transitory computer-readable storage of claim 6, wherein the local resource type further includes a name and a base type.

9. The non-transitory computer-readable storage of claim 6, wherein the resource is an infrastructure resource.

10. The non-transitory computer-readable storage of claim 6, wherein adding each said node further includes, locating, in a local persistent memory, zero or more override values associated with the local resource type for zero or more attributes of the resource instance, wherein the resource instance is created further based on the zero or more override values.

11. A method comprising:

storing a single local resource profile that specifies attributes for a resource of a local resource type, wherein said single local resource profile is used for configuring nodes in a cluster to facilitate the addition of nodes to or the deletion of nodes from said cluster, and wherein said single local resource profile includes one or more attributes and one or more values of the one or more attributes; and for each node of a plurality of nodes, adding, by a clusterware manager, each said node to said cluster;

wherein adding each said node includes:

for each said node, creating a resource instance for at least one resource of the local resource type, wherein the resource instance includes one or more instance attributes according to the single local resource profile;

locating zero or more override values local to each said node for zero or more attributes of the resource instance, wherein each of the zero or more override values is associated with the local resource type, wherein at least one override value exists in at least one node in the cluster; and configuring the one or more instance attributes of the resource instance according to the single local resource profile and the zero or more override values, wherein the one or more values of the single local resource profile are default values for the one or more instance attributes;

wherein the method is performed by one or more computing devices.

12. The method of claim 11, further including the step of deleting the zero or more override values for a resource instance for a particular node.

13. The method of claim 12, further including the step of deleting the particular node from the cluster.

14. The method of claim 11, wherein the zero or more override values for a particular resource instance for a particular node are stored on storage that is local to the particular node.

15. The method of claim 11, wherein the local resource type further includes a name and a base type.

16. A non-transitory computer-readable storage that stores instructions which, when executed by one or more processors, cause the one or more processors to perform the steps of:

storing a single local resource profile that specifies attributes for a resource of a local resource type, wherein said single local resource profile is used for configuring nodes in a cluster to facilitate the addition of nodes to or the deletion of nodes from said cluster, and wherein said single local resource profile includes one or more attributes and one or more values of the one or more attributes; and for each node of a plurality of nodes, adding, by a clusterware manager, each said node to said cluster;

wherein adding each said node includes:

for each said node, creating a resource instance for at least one resource of the local resource type, wherein the resource instance includes one or more instance attributes according to the single local resource profile;

locating zero or more override values local to each said node for zero or more attributes of the resource instance, wherein each of the zero or more override values is associated with the local resource type, wherein at least one override value exists in at least one node in the cluster; and configuring the one or more instance attributes of the resource instance according to the single local resource profile and the zero or more override values, wherein the one or more values of the single local resource profile are default values for the one or more instance attributes.

17. The non-transitory computer-readable storage of claim 16, further including instructions to perform the step of deleting the zero or more override values for a resource instance for a particular node.

18. The non-transitory computer-readable storage of claim 17, further including instructions to perform the step of deleting the particular node from the cluster.

19. The non-transitory computer-readable storage of claim 16, wherein the zero or more override values for a particular resource instance for a particular node are stored on storage that is local to the particular node.

20. The non-transitory computer-readable storage of claim 16, wherein the local resource type further includes a name and a base type.

* * * * *

UNITED STATES PATENT AND TRADEMARK OFFICE
CERTIFICATE OF CORRECTION

| | |
|---|---|
| PATENT NO. | : 8,949,425 B2 |
| APPLICATION NO. | : 12/688715 |
| DATED | : February 3, 2015 |
| INVENTOR(S) | : Gusev et al. |

It is certified that error appears in the above-identified patent and that said Letters Patent is hereby corrected as shown below:

ON THE TITLE PAGE

On page 2, column 2, under Other Publications, line 1, delete "Adminstration" and insert -- Administration --, therefor.

Signed and Sealed this
Twenty-fourth Day of November, 2015

Michelle K. Lee
*Director of the United States Patent and Trademark Office*